United States Patent
Sim et al.

(10) Patent No.: US 8,363,049 B2
(45) Date of Patent: Jan. 29, 2013

(54) 3D IMAGE PROCESSING METHOD AND APPARATUS FOR ENABLING EFFICIENT RETRIEVAL OF NEIGHBORING POINT

(75) Inventors: Jae Young Sim, Yongin-si (KR); Do Kyoon Kim, Seongnam-si (KR); Kae Chang Lee, Yongin-si (KR); Gael Guennebaud, Zurich (CH); Mario Botsch, Zurich (CH); Markus Gross, Zurich (CH); Robert Carnecky, Zurich (CH)

(73) Assignee: Samsung Electronics Co., Ltd., Suwon-Si (KR)

( * ) Notice: Subject to any disclaimer, the term of this patent is extended or adjusted under 35 U.S.C. 154(b) by 697 days.

(21) Appl. No.: 12/285,944

(22) Filed: Oct. 16, 2008

(65) Prior Publication Data

US 2009/0213113 A1   Aug. 27, 2009

(30) Foreign Application Priority Data

Feb. 25, 2008   (KR) .................. 10-2008-0016996

(51) Int. Cl.
*G06T 15/00*   (2006.01)
(52) U.S. Cl. ........ 345/419; 345/420; 345/421; 345/422; 345/423; 345/424; 345/425; 345/426; 345/427
(58) Field of Classification Search ........... 345/419–427
See application file for complete search history.

(56) References Cited

U.S. PATENT DOCUMENTS

| | | | | |
|---|---|---|---|---|
| 5,933,146 A * | 8/1999 | Wrigley | ........................ | 345/420 |
| 6,137,493 A * | 10/2000 | Kamimura et al. | ........... | 345/423 |
| 6,181,820 B1 * | 1/2001 | Tachikawa et al. | ........... | 382/190 |
| 6,259,453 B1 * | 7/2001 | Itoh et al. | ....................... | 345/423 |
| 6,587,103 B1 * | 7/2003 | Tucker | .......................... | 345/421 |
| 6,771,840 B1 | 8/2004 | Iannou et al. | | |
| 6,868,420 B2 * | 3/2005 | Perry et al. | ..................... | 707/743 |
| 6,990,236 B2 | 1/2006 | Boettcher | | |
| 7,218,775 B2 * | 5/2007 | Kokko et al. | .................. | 382/156 |
| 7,379,602 B2 * | 5/2008 | Yang | ............................. | 382/225 |
| 7,586,489 B2 * | 9/2009 | Muller-Fischer et al. | ..... | 345/427 |
| 7,940,279 B2 * | 5/2011 | Pack | ............................. | 345/582 |
| 2004/0024779 A1 | 2/2004 | Perry et al. | | |
| 2004/0162839 A1 | 8/2004 | Udeshi et al. | | |
| 2008/0291200 A1 * | 11/2008 | Fraser et al. | .................. | 345/420 |

FOREIGN PATENT DOCUMENTS

JP   9-27046   1/1997

* cited by examiner

*Primary Examiner* — Xiao M. Wu
*Assistant Examiner* — Todd Buttram
(74) *Attorney, Agent, or Firm* — Staas & Halsey LLP

(57) ABSTRACT

Disclosed are data storing and processing methods or apparatuses which may efficiently perform a process of retrieving neighboring points between points stored in a leaf cell in a point-based 3D data expressing method. A computer-readable recording medium having stored thereon instructions for implementing a method of three-Dimensional (3D) data processing, the instructions including an instruction set of connecting each of a plurality of points with a leaf cell of a spatial tree structure; an instruction set of assigning a ball to correspond to each of the plurality of points; and an instruction set of connecting the ball with a leaf cell intersecting the ball.

21 Claims, 9 Drawing Sheets

3D IMAGE PROCESSING METHOD AND APPARATUS FOR ENABLING EFFICIENT RETRIEVAL OF NEIGHBORING POINT

CROSS-REFERENCE TO RELATED APPLICATIONS

This application claims the benefit of Korean Patent Application No. 10-2008-0016996, filed on Feb. 25, 2008, in the Korean Intellectual Property Office, the disclosure of which is incorporated herein by reference.

BACKGROUND

1. Field

The present invention relates to a three-dimensional (3D) image processing method, and more particularly, to data storing and processing methods (or apparatuses) which may efficiently perform a process of retrieving neighboring points between points stored in a leaf cell in a point-based 3D data expressing method.

2. Description of the Related Art

Currently, studies of a method for obtaining three-dimensional (3D) information through image matching after obtaining a depth image using a depth camera and then obtaining a color image using general Charge-Coupled Device (CCD)/Complementary Metal Oxide Semiconductor (CMOS) cameras have been attempted.

As examples of methods for representing the 3D information obtained as described above, a method using a triangular mesh, a method using point cloud, and the like may be given. The obtained 3D information may be transformed into an efficient representing structure after an appropriate modeling process is performed. In this manner, performance of the transformation or various processing and rendering after the transformation may significantly depend on efficiency of a data structure expressing 3D information.

In a mesh-based 3D information expressing method, neighboring pixels are connected using regularity of images and mesh connection information is generated to process images. According to the mesh based 3D information expressing method, noises, holes, and the like generated when obtaining the depth image may be relatively easily eliminated. However, the mesh based 3D information expressing method may require a stitching process with respect to overlapped portions of a plurality of pieces of image data, which is known as a significantly complex process, in order to generate a single 3D mesh model from the plurality of pieces of image data being different from a piece of image data.

Meanwhile, in a point-based 3D information expressing method, a relatively efficient 3D model may be generated in comparison with the mesh-based 3D information expressing method because 3D point data obtained from the plurality of pieces of the image is simply combined on a space. In this instance, the above described point data may be stored in a spatial data structure such as a kd-tree or an octree. The spatial data structure such as the octree used in a conventional point-based 3D information expressing method may not have connection information between points as in a polygon mesh method, and thereby retrieving of neighboring points required for performing various types of processing may require a great amount of time.

SUMMARY

Accordingly, it is an aspect of the present invention to provide a three-dimensional(3D) data storing method which may store 3D data obtained by a depth camera from an object using an improved method, thereby improving efficiency in storing and processing point-based 3D data.

It is another aspect of the present invention to provide a 3D data processing method and apparatus which may efficiently retrieve information on neighboring points from among points stored in the point-based 3D data structure.

Still another aspect of the present invention provides a data processing method such as a k Nearest Neighbors (kNN) query, a Spatial Ball Neighbors (SBN) query, a leaf cell division, and the like using a data structure obtained in the improved method.

Additional aspects and/or advantages will be set forth in part in the description which follows and, in part, will be apparent from the description, or may be learned by practice of the invention.

The foregoing and/or aspects may be achieved by providing a computer-readable recording medium having stored thereon instructions for implementing a method of three-dimensional (3D) data processing, the instructions including: an instruction set of connecting each of a plurality of points with a leaf cell of a spatial tree structure; an instruction set of assigning a ball to correspond to each of the plurality of points; and an instruction set of connecting the ball with a one of the leaf cells intersecting the ball.

In this instance, the computer-readable recording medium may further include an instruction set of retrieving, in the spatial tree structure, a first leaf cell associated with a first point from among the plurality of points; an instruction set of retrieving a second ball intersecting the first leaf cell; and an instruction set of retrieving a second point corresponding to the second ball.

Also, the computer-readable recording medium may further include an instruction set generating a Moving Least Square (MLS) surface based on first and second ones of the points.

Also, the instruction set of assigning the ball assigns a ball having an adaptive radius to correspond to each of the plurality of points.

According to another aspect of the present invention, there is provided a computer-readable recording medium having stored thereon instructions for implementing a method of data processing, the instructions including: an instruction set of connecting each of a plurality of points with at least one leaf cell of a quad tree structure; an instruction set of assigning a circle to correspond to each of the plurality of points; and connecting the circle with a one of the leaf cells intersecting the circle.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION OF EMBODIMENTS

Figure 1:
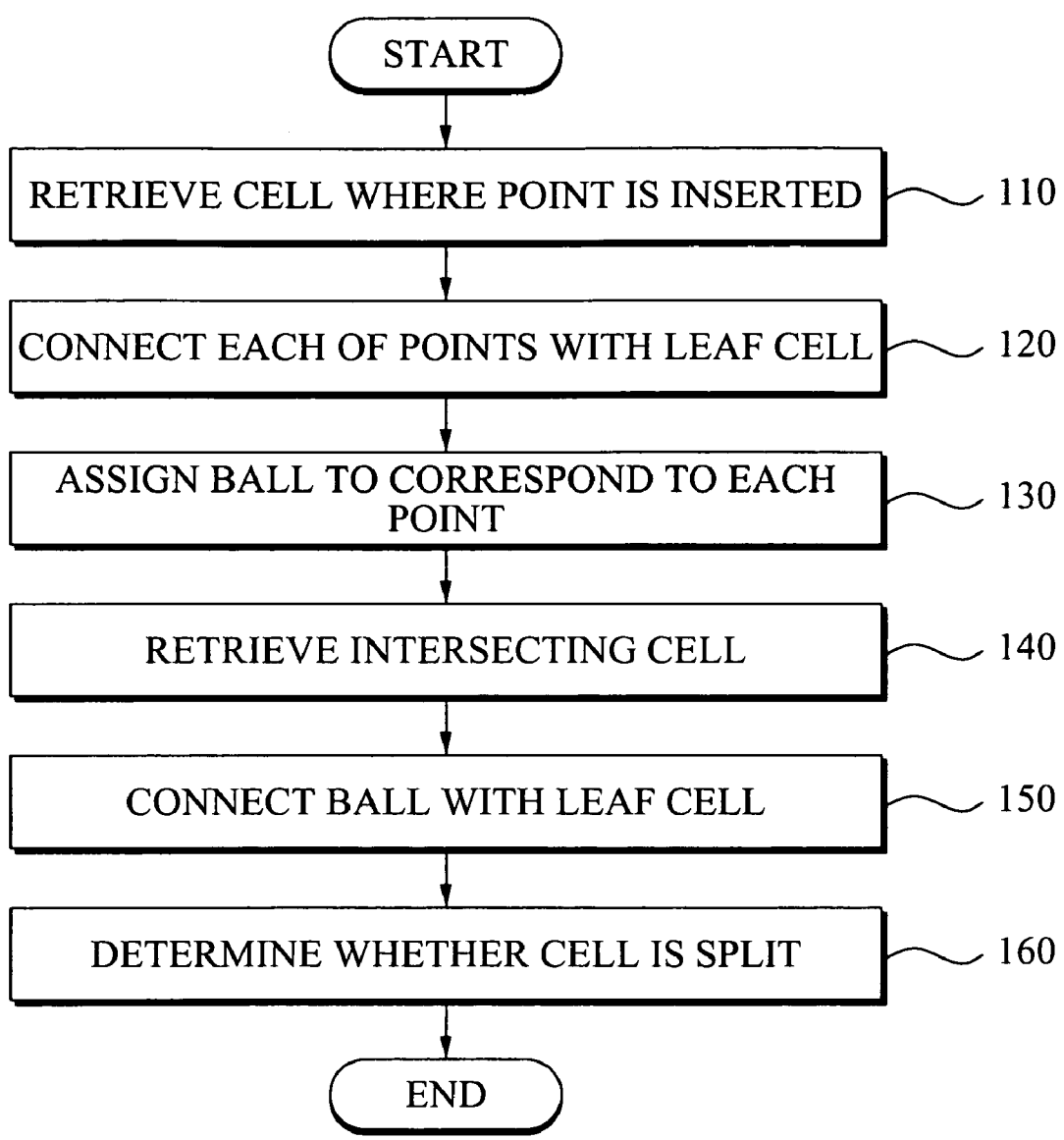
FIG. 1 is a flowchart illustrating a method of storing location information of points composing a 3D object in a spatial tree structure according to an exemplary embodiment of the present invention.

Reference will now be made in detail to the embodiments, examples of which are illustrated in the accompanying drawings, wherein like reference numerals refer to the like elements throughout. The embodiments are described below to explain the present invention by referring to the figures.

FIG. 1 is a flowchart illustrating a method of storing location information of points composing a 3D object in a spatial tree structure according to an exemplary embodiment of the present invention.

In operation S110, an image processing apparatus may retrieve a cell in which location information of points is inserted. According to the present exemplary embodiment of the present invention, location information of points composing a 3D object may be stored in a spatial tree structure. The spatial tree structure may be a data structure having a hierarchical structure and representing the location information of points composing the object, and for example, may be a kd-tree or an octree. Herein, the octree may be described in detail as an example of the spatial tree structure, however, the present invention is not limited thereto. A three-dimensional (3D) location information of points composing a 3D object may be obtained in various methods such as an image-based method using computer vision techniques, a method using a depth acquiring device, and the like. As an example, the 3D location information of points may be obtained using a depth camera such that the depth camera is located in multiple points of view with respect to a single object to thereby obtain a plurality of depth images according to the time points. The image processing apparatus may store the location information of points in the octree. In this case, the image processing apparatus may retrieve a cell of the octree in which the location information of points is inserted in operation S110. The octree is a spatial tree structure in which a cube on a space is split into 8 portions and a point intended to be stored is assigned to a descendant of a lower splitting step.

In operation S120, the image processing apparatus may connect each of a plurality of points with a leaf cell of a spatial tree structure. In order to store point-based 3D data, a cell may be assigned to each of the plurality of points. Operation S120 may be implemented by dividing the cell within the spatial tree structure and storing points in a sub-cell. The sub-cell may be the leaf cell. For example, when inserting the points composing the 3D object to the octree, the image processing apparatus traverses the octree to find target leaf cell. Then, the image processing apparatus inserts the point to the leaf cell.

Figure 2:
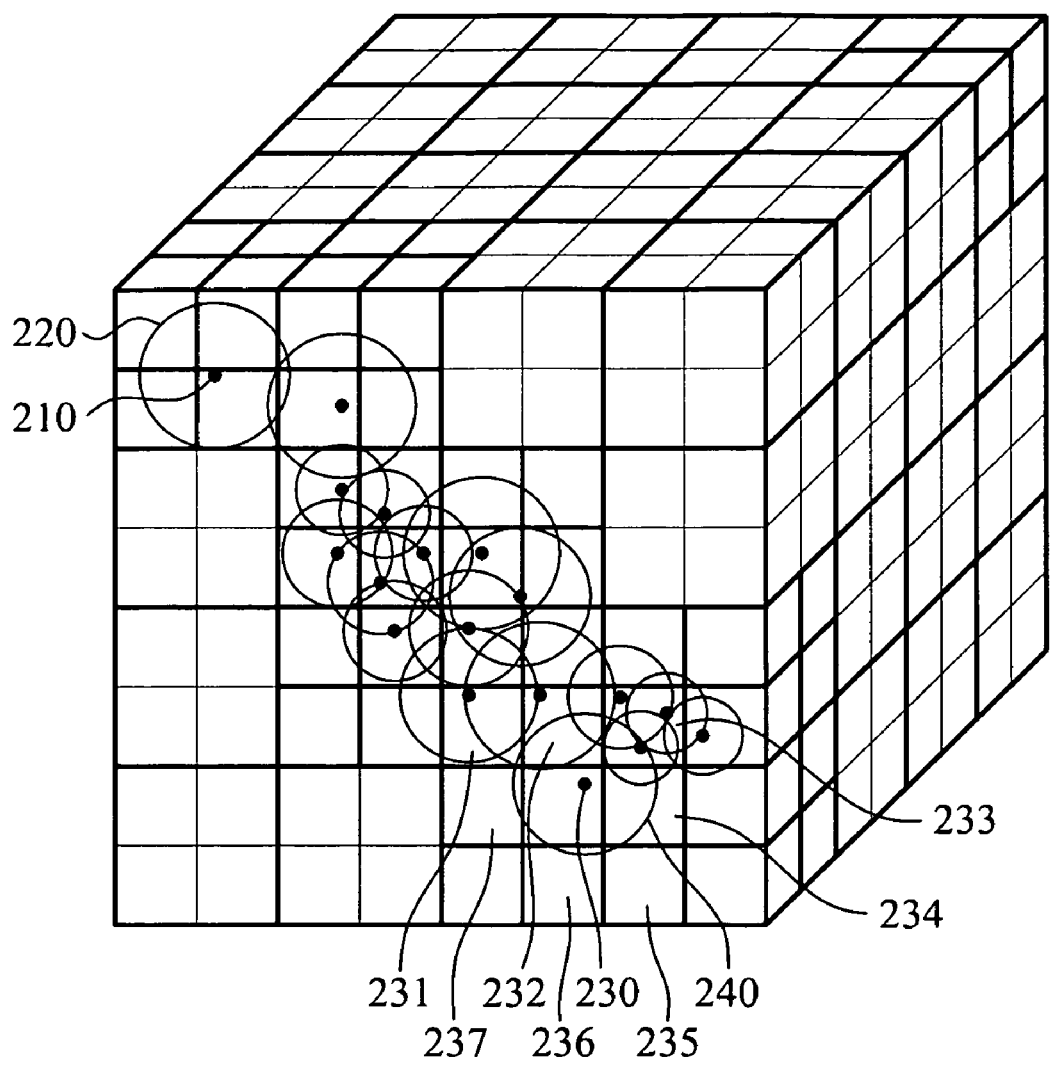
FIG. 2 is a diagram illustrating a case where location information of points is stored in an octree according to an exemplary embodiment of the present invention.

FIG. 2 is a diagram illustrating a case where location information of points is stored in an octree according to an exemplary embodiment of the present invention.

Referring to FIG. 2, a leaf cell is connected with each of points 210 and 230.

In operation S130, the image processing apparatus may assign a ball to correspond to each of the plurality of points. Here, the ball is a sphere. The ball may be assigned to each of the plurality of points. For example, a first ball is assigned to a first point, and a second ball is assigned to a second point. The ball has a radius.

According to the present exemplary embodiment of the present invention, the ball is a sphere having the corresponding point acting as a center. According to the present exemplary embodiment of the present invention, the ball assigned to each of the points has a given radius. For example, a ball having an identical radius may be assigned with respect to all points. According to the present exemplary embodiment of the present invention, the ball assigned to each of the points has an adaptive radius. In this case, the ball assigned to each of the points may be variable. Also, the radius of the ball assigned to each of the points may be different from one another. For example, the radius of the ball may be determined according to a density of a point connected with a leaf cell. In this instance, the leaf cell may be connected with each of the plurality of points. The density may be an index indicating how many neighboring points exist. A method of determining the density is not limited to a single exemplary embodiment. According to the present exemplary embodiment of the present invention, a distance between the first point and a k-th nearest point from the first point may be determined as a radius of the ball. In this instance, 'k' is a natural number greater than '1'. In this case, as a number of neighboring points of the first point increases, a distance between the first point and the k-th nearest point from the first point decreases, and thereby a radius of the ball assigned to the first point is reduced. Referring to FIG. 2, a ball 220 is assigned to the point 210, and a ball 240 is assigned to the point 230.

In operation S140, the image processing apparatus may retrieve a cell intersecting the ball assigned to the point. The image processing apparatus may compare (1) the radius of the ball assigned to the point and (2) a distance between the point and a neighboring cell including the point, thereby retrieving the cell intersecting the ball assigned to the point.

In operation S150, the ball may be connected with a leaf cell intersecting the ball. The ball is assigned to the point, and connected with a cell connected with the point. For example, when the first point is stored in the first cell and the first ball is assigned to the first point, the first ball is connected with the first cell. Specifically, reference information of the first ball is stored in the first cell. Also, when another cell intersecting the ball exists, the ball is also connected with the other cell. For example, the other cell may also store the reference information of the ball. Thus, according to the present exemplary embodiment of the present invention, information about the balls intersecting the cell may be obtained based on the cell.

According to the present exemplary embodiment of the present invention, information about a leaf cell where the point is stored may be easily obtained from a single first point from among points composing a 3D object, and information about points corresponding to the balls intersecting the leaf cell may be also easily obtained from the leaf cell. The obtained points may be points located near the first point. Thus, according to the present exemplary embodiment of the present invention, information is obtained about other points located near an arbitrary point from among the points composing the 3D object.

In operation S160, according to the present exemplary embodiment of the present invention, the image processing apparatus may determine whether the leaf cell intersecting the ball is split. The spatial tree structure according to the present exemplary embodiment of the present invention may generate a hierarchical tree structure by repeatedly splitting the cell. In this case, when either (1) the tree depth is a given maximum tree depth or (2) the cell has a given minimum number of points and a length of a diagonal line of the cell is less than a mean ball size, the split of the cell is stopped and the leaf cell is determined. For example, when a length of a diagonal line of the leaf cell is greater than a mean diameter of the balls corresponding to each of the plurality of points, the leaf cell intersecting the ball is split. By splitting the leaf cell as described above, a smaller leaf cell capable of storing the points may be obtained along with an increase in the density of the points.

According to the present exemplary embodiment of the invention, the point may be inserted within the spatial tree structure for processes such as hole filling, and the like. The above point insertion may be divided into a point location information inserting process and a ball information inserting process. The point location information insertion process may include computing a location code of a target cell including a given point, retrieving the target cell by performing a tree traversal until the leaf cell is detected from a root cell, and determining whether the target cell is further split after inserting the location information of the point in the target cell.

Meanwhile, the ball information insertion process may include computing a bounding box of the ball, computing a location code of the first cell including the bounding box, performing a tree retrieval until either the leaf cell or the first cell is detected from the root cell, determining whether all cells of a sub-tree of the first cell intersect the ball to thereby store reference information of the ball only in a cell intersecting the ball, and determining whether a cell where the reference information is added is further split. According to the present exemplary embodiment of the present invention, determining whether the cell is further split during either the point location information inserting process or the ball information inserting process may be performed by a method for splitting the leaf cell intersecting the ball when the length of the diagonal line of the leaf cell where a new point is stored is greater than the mean diameter of the ball corresponding to each of the plurality of points within the spatial tree structure.

As illustrated in FIG. 2, according to the present exemplary embodiment of the present invention, 3D location information of points composing the 3D object may be stored in the octree structure.

The octree may be a spatial tree structure in which a cube on a space is split into 8 portions and a point intended to be stored is assigned to a descendant of a lower splitting operation. For example, as illustrated in FIG. 2, when the location information of additional points is required to be stored, a cell 235 may be split into 8 portions to thereby store location information of added points.

As illustrated in FIG. 2, the points 210 and 230 may be stored in each cell. Also, the balls 220 and 240 are assigned to correspond to each of the points 210 and 230, respectively. In this instance, the balls 220 and 240 are a sphere. As illustrated in FIG. 2, the ball 240 intersects cells 231, 232, 233, 234, 235, 236, and 237. In this case, the cells 231, 232, 233, 234, 235, 236, and 237 may store reference information about the ball 240. The reference information about the ball 240 may be a pointer with respect to a memory space where information about the ball 240 is stored.

According to the present exemplary embodiment of the present invention, the balls assigned to the plurality of points do not yield the same size, and may have adaptive radii. For example, the radius of the ball may be determined according to a density of points connected with the leaf cell including points connected with the ball.

Figure 3:
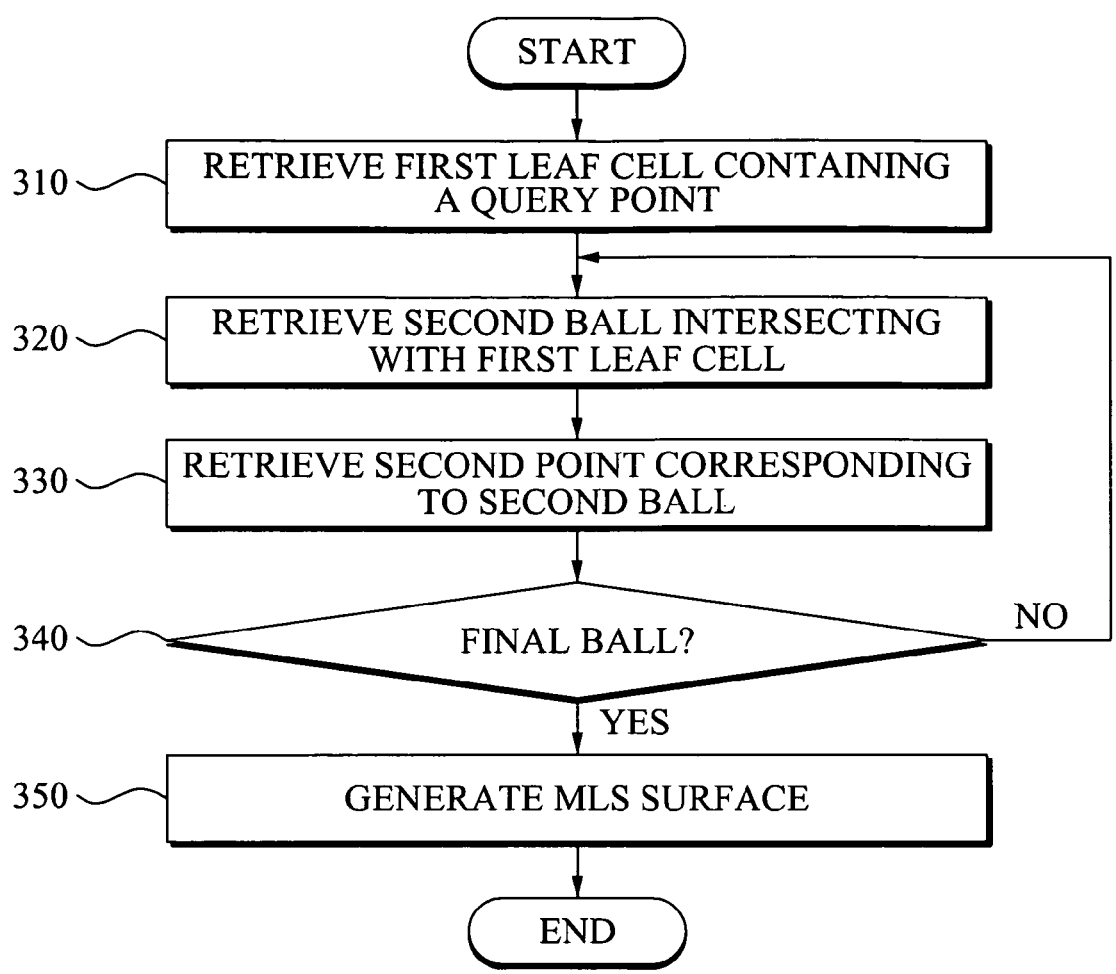
FIG. 3 is a flowchart illustrating a method of generating a Moving Least Square (MLS) surface by retrieving a neighboring point according to an exemplary embodiment of the present invention.

FIG. 3 is a diagram illustrating a method of generating a Moving Least Square (MLS) surface by retrieving a neighboring point according to an exemplary embodiment of the present invention.

In operation S310, the image processing apparatus may retrieve the first leaf cell, containing the location information of a query point. When the octree is used as the spatial tree structure, the image processing apparatus may perform a tree traversal with respect to the octree, thereby retrieving the first leaf cell, containing the query point.

In operation S320, the image processing apparatus may retrieve a second ball intersecting the first leaf cell. Through operations 140 and 150 of FIG. 1, the reference information of the ball intersecting the first leaf cell may be stored in the first leaf cell. Thus, the image processing apparatus may read the reference information of the ball intersecting the first leaf cell and stored in the first leaf cell in operation S320, thereby obtaining information about a second ball intersecting the first leaf cell. In case of a plurality of balls intersecting the first leaf cell, information about the plurality of balls intersecting the first leaf cell may be stored in the first leaf cell.

In operation S330, the image processing apparatus may retrieve a second point corresponding to the second ball. In operation S130 of FIG. 1, a ball is assigned to correspond to each of points stored in the spatial tree structure. In operation S330, the image processing apparatus may retrieve the second point corresponding to the second ball using the relationship between the point and the ball. For example, each of the balls may store reference information of points corresponding to the balls. In this case, the image processing apparatus may obtain information about the points corresponding to the ball using the reference information of the points stored in the ball.

In operation S340, the image processing apparatus may determine whether another ball intersecting the first leaf cell exists. When the ball intersecting the first leaf cell is a plurality of balls, information about a plurality of points may be obtained to correspond to each of the plurality of balls. For example, when the ball intersecting the first leaf cell is two of a ball_A and a ball_B, the ball_A is first retrieved in operation S320, and then a point_A corresponding to the ball_A is retrieved in operation S330. Next, in operation S340, since another ball intersecting the first leaf cell exists, the ball_B is retrieved by returning to operation S320. Next, in operation S330, a point_B corresponding to the ball_B is retrieved. When information about points corresponding to all balls intersecting the first leaf cell is obtained, the image processing apparatus may advance to operation S350.

In operation S350, the image processing apparatus may generate a Moving Least Square (MLS) surface based on the first point and the second point. The MLS surface is a continuous and smooth surface generated using a MLS operator from points discretely distributed. Through operations 310 and 340, the image processing apparatus may obtain information about a single point composing the 3D object and neighboring points of the single point. The image processing apparatus may generate the MLS surface by applying the MLS operator to the point. In generating the MLS surface, neighboring points are required to be retrieved and a distance with each of the points is required to be computed. According to the present exemplary embodiment of the present invention, efficiency of the computation may be increased. According to the present exemplary embodiment of the present invention, information about other points located near an arbitrary point from among points composing the 3D object may be readily obtained, and thus readily obtaining 3D image. Also, according to the present exemplary embodiment of the present invention, a projection surface may be generated using a projection operator other than the MLS operator.

Figure 4:
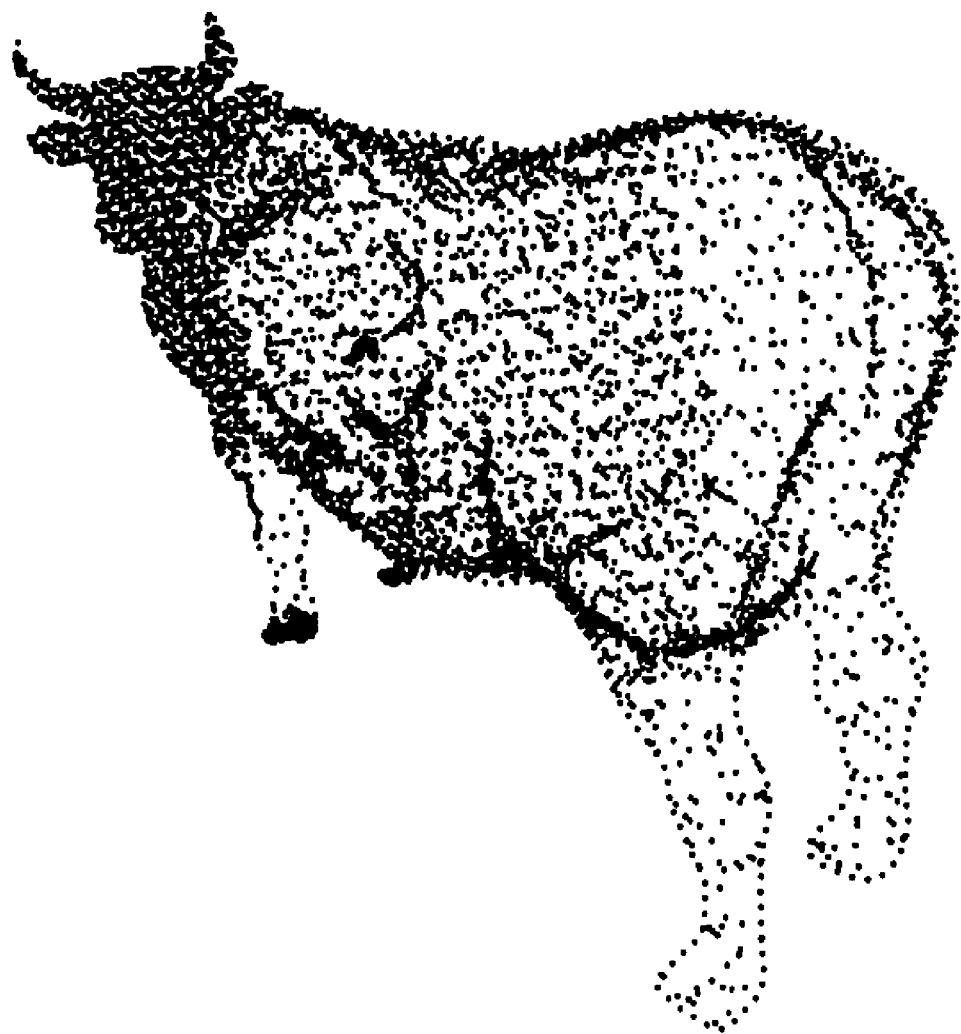
FIG. 4 is a diagram illustrating an example of a three-dimensional (3D) image obtained using a MLS surface according to an exemplary embodiment of the present invention.

FIG. 4 is a diagram illustrating an example of a 3D image obtained using a MLS surface according to an exemplary embodiment of the present invention.

Figure 5:
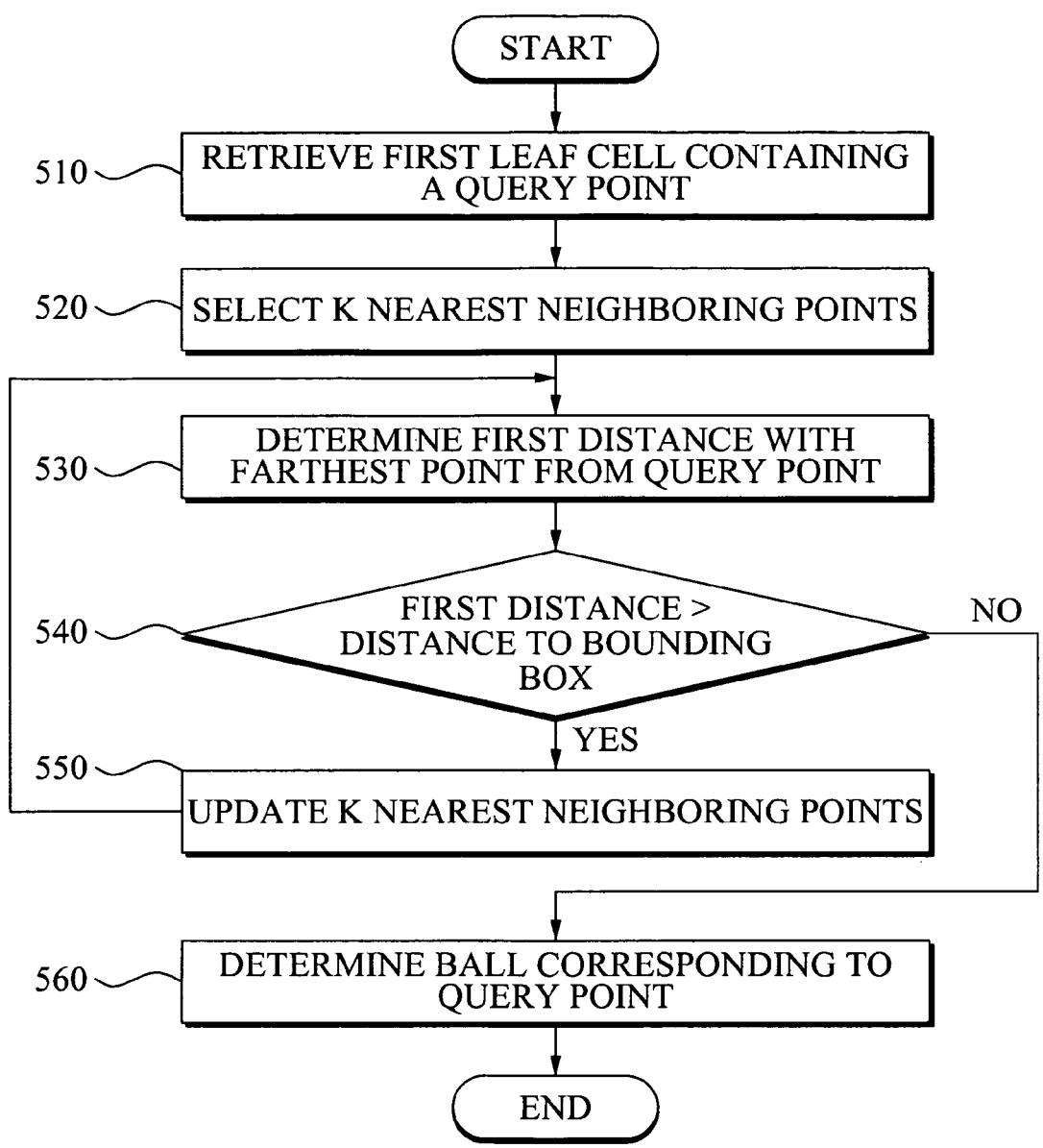
FIG. 5 is a flowchart illustrating a method of determining a ball corresponding to each of points according to an exemplary embodiment of the present invention.

FIG. 5 is a flowchart illustrating a method of determining a ball corresponding to each of points according to an exemplary embodiment of the present invention.

In operation S510, the image processing apparatus may retrieve a first leaf cell containing a query point. The image processing apparatus may retrieve the first leaf cell where location information of the query point is connected. When the octree is used as the spatial tree structure, the image processing apparatus may perform a tree traversal with respect to the octree, thereby retrieving the first leaf cell containing the query point.

In operation S520, the image processing apparatus may select k nearest neighboring points from among the points connected with the first leaf cell. According to the present exemplary embodiment of the present invention, 'k' is a given natural number (for example, k=3).

In operation S530, the image processing apparatus may determine a first distance from the query point to the farthest point among the k neighboring points. For example, when neighboring points of k=3 with respect to the query point are selected, the farthest point among the three neighboring points may be selected, and a distance between the query point and the farthest point may be determined as the first distance.

In operation S540, the image processing apparatus may compare (1) a distance between the query point and a bounding box of a second cell of the spatial tree structure and (2) the first distance.

According to the results of operation S540, when the distance between the query point and the bounding box is less than the first distance, the image processing apparatus may update the k nearest neighboring points according to a distance between a point connected with a leaf cell of a sub-tree of the second cell and the query point (operation 550).

In operation S560, the image processing apparatus may determine the ball corresponding to the query point based on the k nearest neighboring points. According to the present exemplary embodiment of the present invention, each size of the ball assigned to each of the points may differ.

Figure 6:
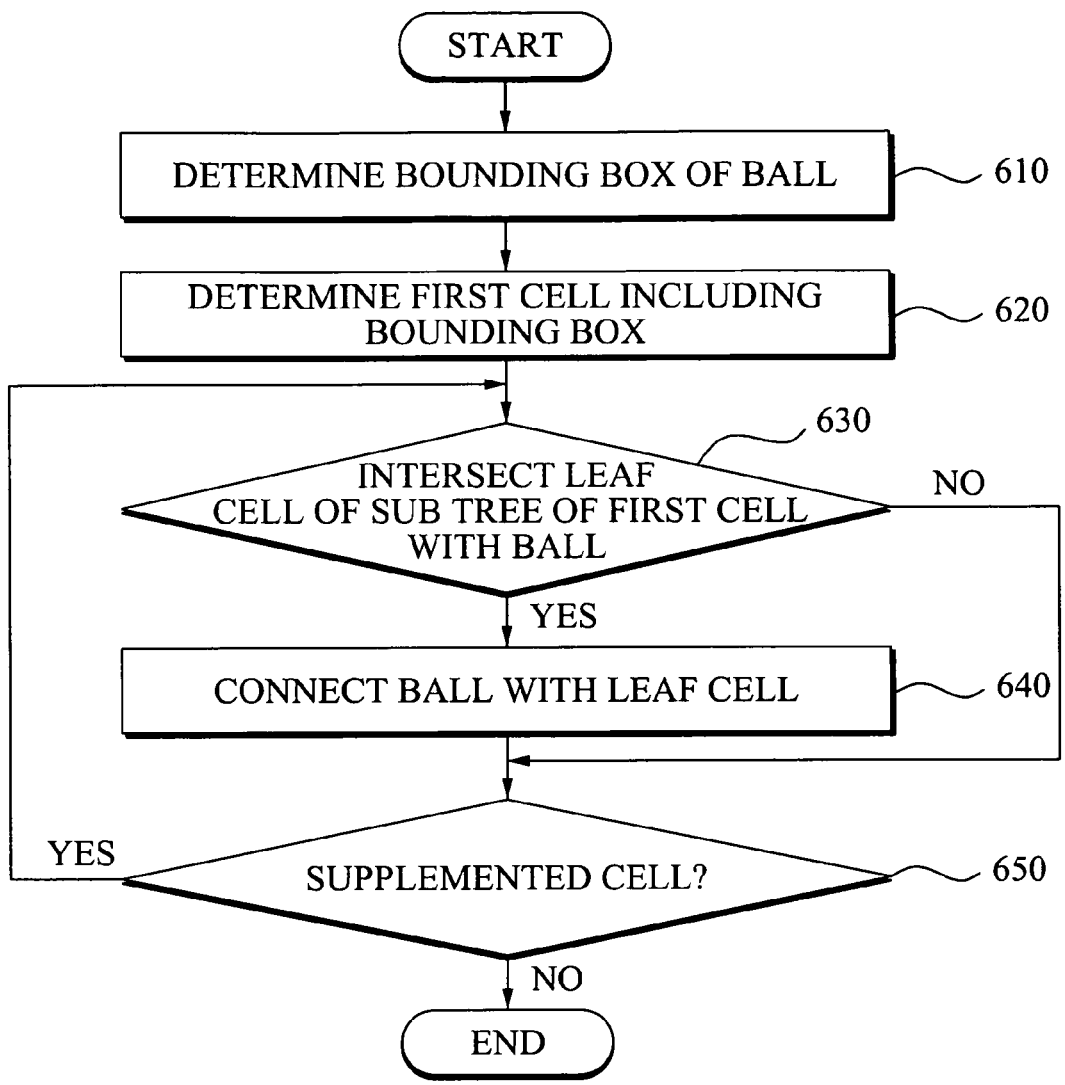
FIG. 6 is a flowchart illustrating a method of inserting, in a leaf cell, information about a ball intersecting the leaf cell according to an exemplary embodiment of the present invention.

FIG. 6 is a flowchart illustrating a method for inserting, in a leaf cell, information about a ball intersecting the leaf cell according to an exemplary embodiment of the present invention.

In operation S610, the image processing apparatus may determine a bounding box of the ball. The bounding box of the ball is a minimum sized-cube including the ball and a point corresponding to the ball acting as a center. For example, when a first ball is assigned to a first point, a minimum-sized cube including the first ball and the first point acting as the center is a bounding box of the first ball.

In operation S620, the image processing apparatus may determine a first cell including the bounding box in the spatial tree structure. The first cell including the bounding box is a cell of a lowest splitting step capable of including all portions of the bounding box. The first cell may include leaf cells of a plurality of sub-trees.

In operation S630, the image processing apparatus may determine whether the leaf cells of the plurality of sub-trees of the first cell intersect the ball.

In operation S640, the image processing apparatus may connect the leaf cell intersecting the ball with the ball. Also, the image processing apparatus may store reference information of the first ball in a leaf cell intersecting the first ball from among the leaf cells of the plurality of sub-trees, and may not store the reference information of the first ball in a leaf cell not intersecting the first ball from among the leaf cells of the plurality of sub-trees.

In operation S650, the image processing apparatus may determine whether a supplementary leaf cell included in the bounding box exists. For example, when a leaf cell not determined whether to intersect the ball, from among the leaf cells of the plurality of sub-trees of the first cell, exists, the image processing apparatus may advance to operation S630.

Figure 7:
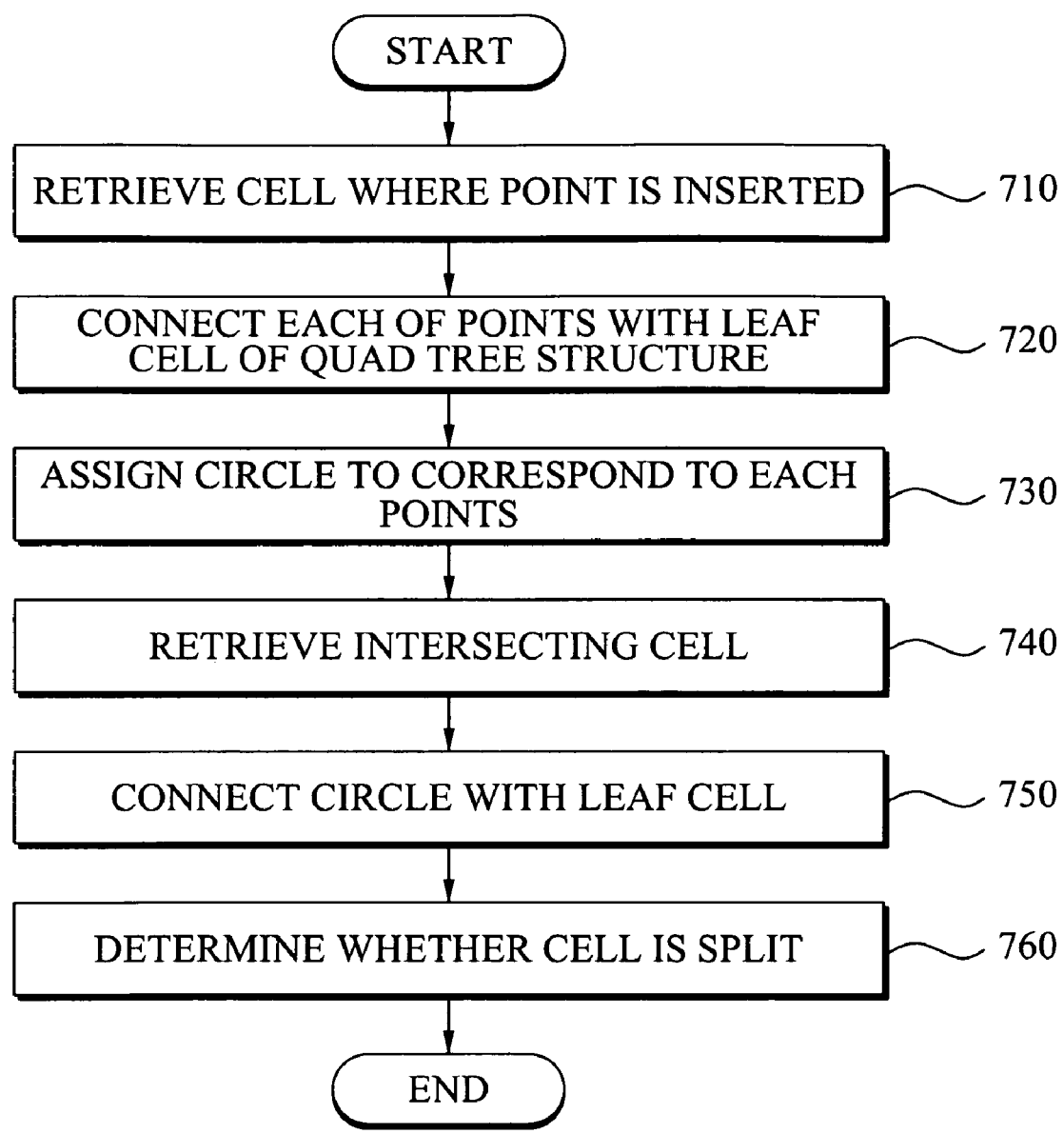
FIG. 7 is a flowchart illustrating a method of storing location information of points composing a 2D object in a quad tree structure according to an exemplary embodiment of the present invention.

FIG. 7 is a flowchart illustrating a method of storing location information of points composing a 2D object in a quad tree structure according to an exemplary embodiment of the present invention.

In operation S710, the image processing apparatus may retrieve a cell in which location information of points composing a 2D object is inserted. According to the present exemplary embodiment of the present invention, the location information of the points may be stored in a quad tree structure. The image processing apparatus may retrieve a cell of the quad tree in which the location information of the points is inserted. The quad tree is a tree data structure in which each node has a maximum of four children nodes.

In operation S720, the image processing apparatus may connect each of the plurality of points with a leaf cell of the quad tree structure. The image processing apparatus may assign a cell to each of the plurality of points in order to store point based 3D data. The image processing apparatus may store the location information of the points in the retrieved leaf cell of the quad tree.

In operation S730, the image processing apparatus may assign a circle to each of the plurality of points. The circle may be assigned one by one to correspond to each of the plurality of points. For example, a first circle is assigned to a first point, and a second circle is assigned to a second point. The circle has a radius.

According to the present exemplary embodiment of the present invention, the circle assigned to each of the plurality of points may have a given radius. For example, circles having an identical radius may be assigned to all the plurality of points. According to another exemplary embodiment of the present invention, the circle assigned to each of the plurality of points may have an adaptive radius. In this case, the radius of the circle assigned to each of the plurality of points may be variable. Also, the radius of the circle may differ. For example, the radius of the circle may be determined according to a density of points connected with the leaf cell connected with each of the plurality of points. According to another exemplary embodiment of the present invention, a distance with a k-th nearest point from the first point may be determined as the radius of the circle. In this instance, 'k' is a natural number. In this case, as a number of points near from the first point increases, the distance with the k-th nearest point from the first point may decrease, and accordingly the radius of the circle assigned to the first point is reduced.

In operation S740, the image processing apparatus may retrieve a cell intersecting the circle assigned to the point. The image processing apparatus may compare (1) the radius of the circle assigned to the point (2) a distance between the point and a neighboring cell of the point, thereby retrieving a cell intersecting the circle assigned to the point.

In operation S750, the image processing apparatus may connect the circle with a leaf cell intersecting the circle. The circle is assigned to the point, however, is required to be first connected with a cell connected with the point. For example, when a first point is stored in a first cell and a first circle is assigned to the first point, the first circle is connected with the first cell. Specifically, reference information of the first circle is stored in the first cell. Also, when another cell intersecting the circle exists, the circle is also connected with the other cell. For example, the other cell may store the reference information of the circle. Thus, according to the present exemplary embodiment of the present invention, information about circles intersecting the cell may be obtained based on the cell.

According to the present exemplary embodiment of the present invention, information about a leaf cell where the point is stored may be obtained from a single first point from among the points composing the 2D object, and information about points corresponding to the circles intersecting the leaf cell may be easily obtained from the leaf cell. The obtained points are points located near the first point. Thus, according to the present exemplary embodiment of the invention, information about other points located near an arbitrary point from among the points composing the 2D object may be readily obtained.

In operation S760, according to the present exemplary embodiment of the present invention, the image processing apparatus may determine whether a leaf cell intersecting the circle is split. The quad tree structure according to the present exemplary embodiment of the present invention may generate a hierarchical tree structure by repeatedly splitting the cell. In this case, when either (1) the tree depth is a given maximum tree depth or (2) the cell has a given minimum number of points and a length of a diagonal line of the cell is smaller than a mean diameter of the circle, the split of the cell is stopped and the leaf cell is determined.

Figure 8:
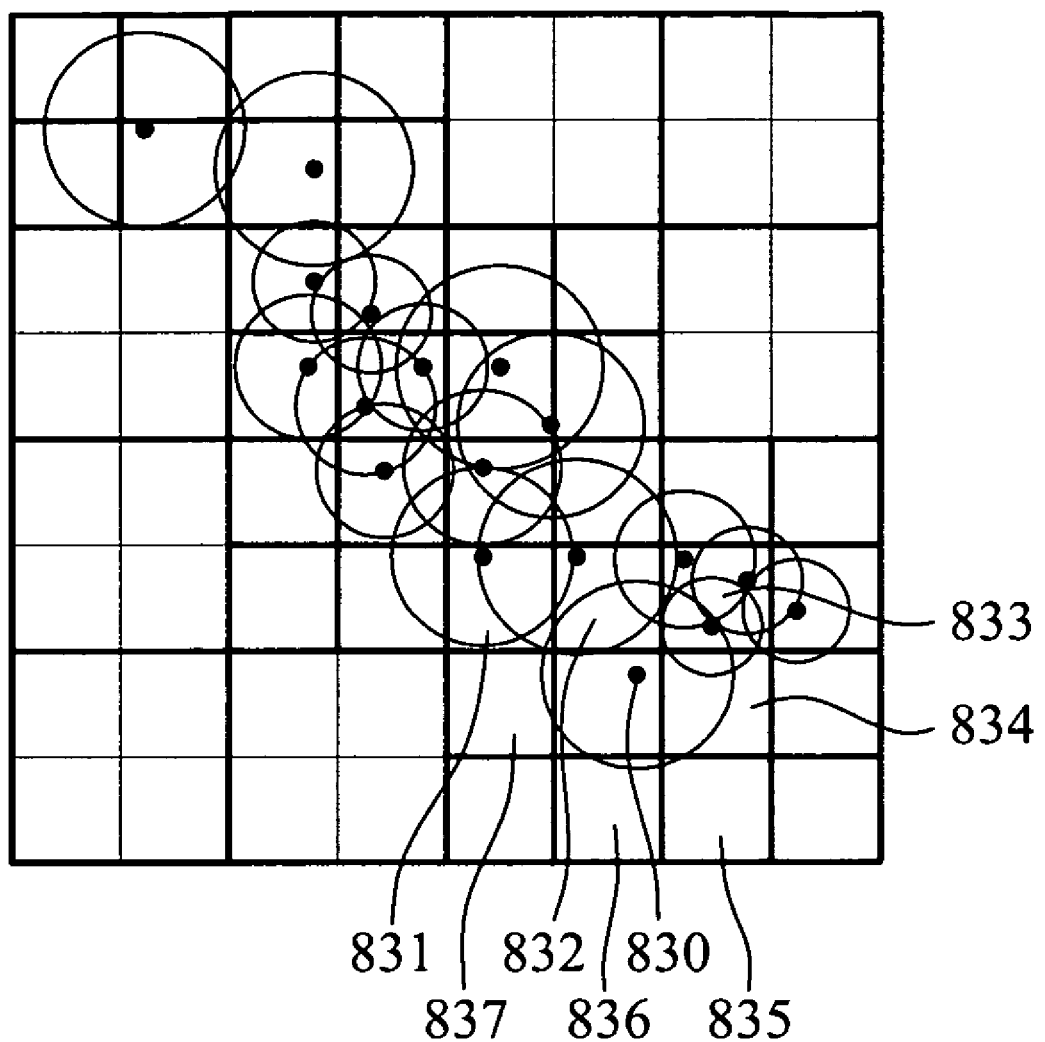
FIG. 8 is a diagram illustrating a state where location information of points composing a 2D object is stored in a quad tree structure according to an exemplary embodiment of the present invention.

FIG. 8 is a diagram illustrating a state where location information of points composing a 3D object is stored in a quad tree structure according to an exemplary embodiment of the present invention.

As illustrated in FIG. 8, according to the present exemplary embodiment of the present invention, location information of the points composing the 3D object is stored in the quad tree structure. As illustrated in FIG. 8, a circle is assigned to correspond to a point 830. The circle of FIG. 8 intersects cells 831, 832, 833, 834, 835, 836, 837. Reference information of the circle may be pointer with respect to a memory space where information about the ball is stored.

Figure 9:
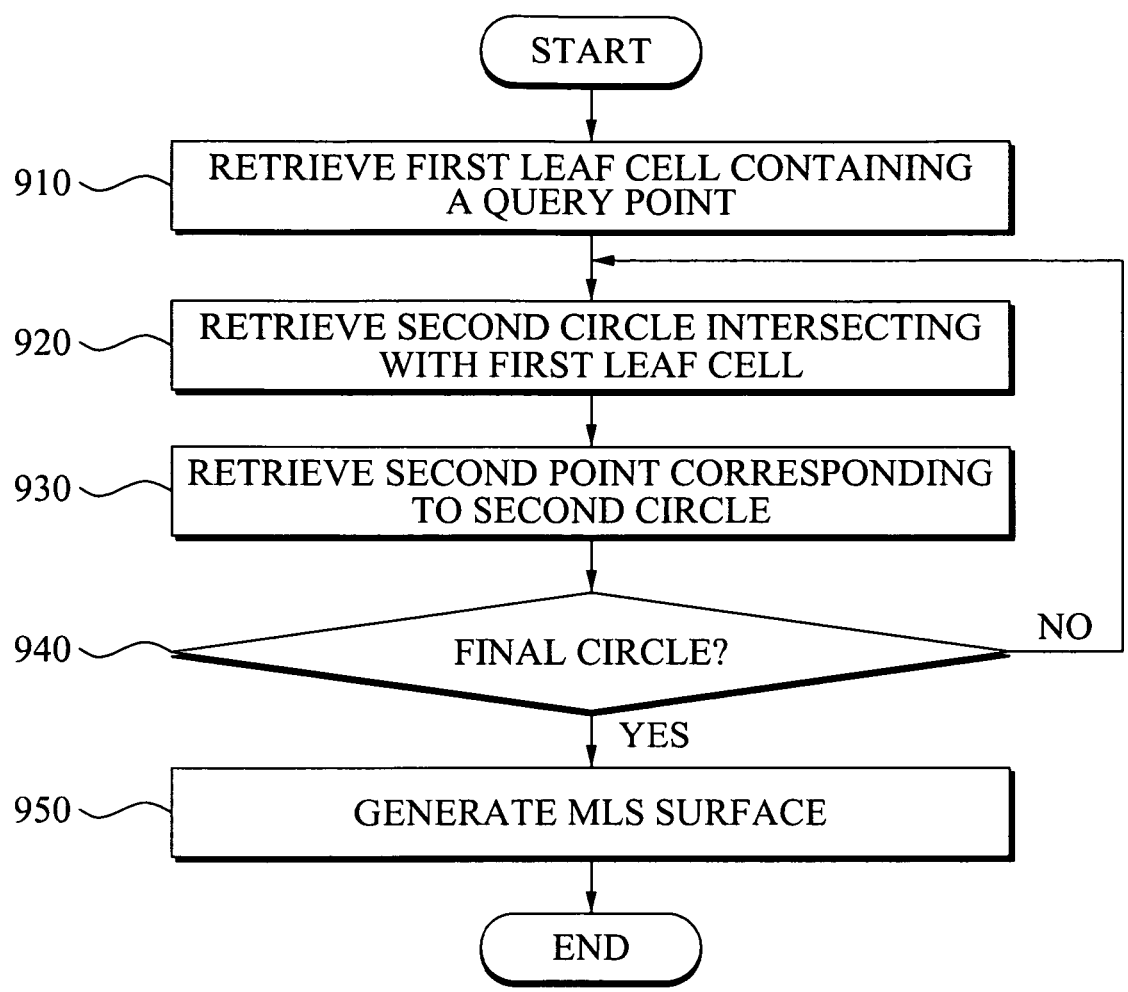
FIG. 9 is a flowchart illustrating a method of generating a MLS surface by retrieving neighboring points of a quad tree structure according to an exemplary embodiment of the present invention.

FIG. 9 is a flowchart illustrating a method of generating a MLS surface by retrieving neighboring points of a quad tree structure according to an exemplary embodiment of the present invention.

In operation S910, the image processing apparatus may retrieve, in the quad tree structure, a first leaf cell connected with a first point from among the plurality of points. The image processing apparatus may retrieve the first leaf cell where location information of the first point from among the plurality of points is stored. The image processing apparatus may perform a tree traversal with respect to the quad tree, thereby retrieving the first leaf cell where the first point is stored.

In operation S920, the image processing apparatus may retrieve a second circle intersecting the first leaf cell. Through operations 740 and 750 of FIG. 7, the reference information of the circle intersecting the first leaf cell is stored in the first leaf cell. Thus, the image processing apparatus may read the reference information of the circle intersecting the first leaf cell and stored in the first leaf cell in operation S920, thereby obtaining information about a second circle intersecting the first leaf cell. The circle intersecting the first leaf cell may be a plurality of circles. In this case, information about the plurality of circles intersecting the first leaf cell may be stored in the first leaf cell.

In operation S930, the image processing apparatus may retrieve a second point corresponding to the second circle. In operation S730 of FIG. 7, a circle is assigned to correspond to each of the plurality of points stored in the quad tree structure. In operation S930, the image processing apparatus may retrieve a second point corresponding to the second circle using relation between the point and the circle in operation S730. For example, each of the circles may store reference information of points corresponding to each of the circles. In this case, the image processing apparatus may obtain information about the point corresponding to the circle using the reference information of the point stored in the circle.

In operation S940, the image processing apparatus may determine whether any other circle intersecting the first leaf cell exists. When the circle intersecting the first leaf cell is a plurality of circles, information about a plurality of points to correspond to each of the plurality of circles may be obtained. For example, when two circles of a circle_A and a circle_B each intersecting the first leaf cell exist, the circle_A is first retrieved in operation S920, and then a point_A corresponding to the circle_A is retrieved in operation S930. Next, in operation S940, since another circle intersecting the first leaf cell exists, the circle_B is retrieved returning to operation S920. Next, in operation S930, a point_B corresponding to the circle_B is retrieved. When information about points corresponding to all circles intersecting the first leaf cell is obtained, the image processing apparatus may advance to operation S950.

In operation S950, the image processing apparatus may generate a MLS surface based on the first point and the second point. Through operations 910 to 940, the image processing apparatus may obtain information about a single point composing a 2D object and information about neighboring points of the single point. The image processing apparatus may generate the MLS surface by applying a MLS operator to the point. Also, according to the present exemplary embodiment of the present invention, a project surface may be generated using another project operator other than the MLS operator.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A non-transitory computer-readable recording medium having stored thereon instructions for implementing a method of three-dimensional (3D) data processing of 3D data, the instructions comprising:
    an instruction set of assigning a first ball to correspond to a first point of a plurality of points stored in a first leaf cell of plural leaf cells of an existing spatial tree structure;
    an instruction set of determining an association of the first point with a second point stored in a second leaf cell of the plural leaf cells, when a second ball assigned to the second point intersects the first leaf cell storing the first point; and
    an instruction set of storing reference information of the determined association.

2. The non-transitory computer-readable recording medium of claim 1, further comprising:
    an instruction set of retrieving, in the spatial tree structure, the first leaf cell associated with the first point from among the plurality of points;
    an instruction set of reading the reference information, stored in the first leaf cell, of the second ball intersecting the first leaf cell; and
    an instruction set of reading the reference information, stored in the first leaf cell, of the second point corresponding to the second ball.

3. The non-transitory computer-readable recording medium of claim 2, further comprising:
    an instruction set generating a Moving Least Square (MLS) surface based on first and second ones of the points.

4. The non-transitory computer-readable recording medium of claim 1, wherein the instructions set of assigning the first ball assigns a ball having an adaptive radius to correspond to each of the plurality of points.

5. The non-transitory computer-readable recording medium of claim 4, wherein the radius of the ball having an adaptive radius, assigned to correspond to each of the plurality of points is determined according to a density of the point associated with the leaf cell associated with each of the plurality of points.

6. The non-transitory computer-readable recording medium of claim 1, wherein the instruction set of assigning comprises:
    an instruction set of retrieving the first leaf cell associated with the first point from among the plurality of points;
    an instruction set of selecting k neighboring points from among the plurality of points associated with the first leaf cell, k being a natural number;
    an instruction set of determining a first distance being the farthest point from the first point from among the k neighboring points;
    an instruction set of updating the k neighboring points according to a distance between a point associated with a leaf cell of a sub-tree of the second cell and the first point when a distance between the first point and a bounding box of the second cell of the spatial tree structure is smaller than the first distance; and
    an instruction set of determining the ball corresponding to the first point based on the k neighboring points.

7. The non-transitory computer-readable recording medium of claim 1, wherein the instruction set of associating the point comprises:
    an instruction set of determining a bounding box of the ball;
    an instruction set of determining a first cell including the bounding box in the spatial tree structure;
    an instruction set of determining whether a leaf cell of a sub-tree of the first cell intersects the ball; and
    an instruction set of storing the reference information of the ball in the intersecting leaf cell.

8. The non-transitory computer-readable recording medium of claim 1, further comprising:
    an instruction set of determining whether the leaf cell intersecting the ball is split.

9. The non-transitory computer-readable recording medium of claim 8, wherein the instruction set of determining splits the leaf cell intersecting the ball when a length of a diagonal line of the leaf cell is greater than a mean diameter of the ball corresponding to each of the plurality of points.

10. The non-transitory computer-readable recording medium of claim 1, wherein the spatial tree structure is either an octree or a kd-tree.

11. The non-transitory computer-readable recording medium of claim 1, wherein the reference information comprises a pointer to a memory space where information about the ball is stored.

12. A non-transitory computer-readable recording medium having stored thereon instructions for implementing a method of data processing, the instructions comprising:
    an instruction set of determining an association between a first point of a plurality of points with a first leaf cell of a quad tree structure;
    an instruction set of assigning a first circle to correspond to the first point of the plurality of points; and
    associating the first point of the first circle with a second point of a second circle, when the second circle intersects the first leaf cell,
    wherein the associating comprises storing reference information of the determined association.

13. The non-transitory computer-readable recording medium of claim 12, further comprising:
    an instruction set of retrieving, from the quad tree structure, the first leaf cell associated with the first point from among the plurality of points;
    an instruction set of reading the reference information, stored in the first leaf cell, of the second circle intersecting the first leaf cell; and
    an instruction set of reading the reference information, stored in the first leaf cell, of the second point corresponding to the second circle.

14. A three-dimensional (3D) data processing method, comprising:
    determining, by a processor, an association between a first point of a plurality of points with a first leaf cell of a plurality of leaf cells of a spatial tree structure;
    assigning a first ball to correspond to the first point of the plurality of points; and
    associating the first point of the first ball with a second point of a second ball when the second ball intersects the first leaf cell,
    wherein the association comprises storing reference information of the determined association.

15. The 3D data processing method of claim 14, further comprising:
retrieving, in the spatial tree structure, the first leaf cell associated with the first point from among the plurality of points;
retrieving the second ball intersecting the first leaf cell; and
retrieving the second point corresponding to the second ball.

16. The 3D data processing method of claim 15, further comprising:
generating a Moving Least Square (MLS) surface based on the first point and the second point.

17. The 3D data processing method of claim 14, wherein the assigning assigns a ball having an adaptive radius to correspond to each of the plurality of points.

18. The 3D data processing method of claim 17, wherein a radius of the ball assigned to correspond to each of the plurality of points is determined according to a density of the point associated with the leaf cell associated with each of the plurality of points.

19. The 3D data processing method of claim 14, wherein the assigning comprises:
retrieving the first leaf cell associated with the first point from among the plurality of points;
selecting k neighboring points from among the plurality of points associated with the first leaf cell, k being a natural number;
determining a first distance with the farthest point from the first point from among the k neighboring points;
updating the k neighboring points according to a distance between a point associated with a leaf cell of a sub-tree of the second cell and the first point when a distance between the first point and a bounding box of the second cell of the spatial tree structure is smaller than the first distance; and
determining the ball corresponding to the first point based on the k neighboring points.

20. The 3D data processing method of claim 14, wherein the associating of the ball comprises:
determining a bounding box of the ball;
determining a first cell including the bounding box in the spatial tree structure;
determining whether a leaf cell of a sub-tree of the first cell intersects the ball; and
associating a leaf cell intersecting the ball with the ball.

21. The 3D data processing method of claim 14, further comprising:
determining whether the leaf cell intersecting the ball is split.

* * * * *